(12) United States Patent
Damarla et al.

(10) Patent No.: US 7,346,359 B2
(45) Date of Patent: Mar. 18, 2008

(54) METHOD FOR RF FINGERPRINTING

(75) Inventors: Chanakya Damarla, Pittsburgh, PA (US); James Ivers, Pittsburgh, PA (US); Mark Pollard, Hudson, MA (US); Andrew J. Kompanek, Pittsburgh, PA (US); Brian H. Trammell, Pittsburgh, PA (US)

(73) Assignee: Pango Networks, Inc., Framingham, MA (US)

( * ) Notice: Subject to any disclaimer, the term of this patent is extended or adjusted under 35 U.S.C. 154(b) by 159 days.

(21) Appl. No.: 10/902,510

(22) Filed: Jul. 29, 2004

(65) Prior Publication Data

US 2005/0040968 A1    Feb. 24, 2005

Related U.S. Application Data

(60) Provisional application No. 60/491,379, filed on Jul. 31, 2003.

(51) Int. Cl.
*H04Q 7/20* (2006.01)

(52) U.S. Cl. ............... 455/456.1; 455/404.2; 455/456.2; 455/456.3; 455/456.5; 455/456.6; 455/457

(58) Field of Classification Search ..... 455/456.1–457, 455/456.3, 414.1–4, 404.2, 432.1, 435.1, 455/440–441; 701/207, 213–214; 340/988; 342/357.1, 357.06, 357.12, 450, 457
See application file for complete search history.

(56) References Cited

U.S. PATENT DOCUMENTS

| | | | |
|---|---|---|---|
| 5,121,126 A * | 6/1992 | Clagett ................. | 342/419 |
| 5,539,395 A | 7/1996 | Buss et al. | |
| 5,554,321 A | 9/1996 | Choy et al. | |
| 5,555,376 A | 9/1996 | Theimer et al. | |
| 5,559,520 A * | 9/1996 | Barzegar et al. ......... | 342/357.1 |
| 5,570,085 A | 10/1996 | Bertsch | |
| 5,572,195 A | 11/1996 | Heller et al. | |
| 5,579,535 A | 11/1996 | Orlen et al. | |
| 5,717,406 A * | 2/1998 | Sanderford et al. ........ | 342/457 |
| 5,717,688 A | 2/1998 | Belanger et al. | |
| 5,719,584 A * | 2/1998 | Otto .......................... | 342/465 |
| 5,796,727 A | 8/1998 | Harrison et al. | |
| 5,796,827 A | 8/1998 | Coppersmith et al. | |
| 5,812,865 A | 9/1998 | Theimer et al. | |
| 5,898,831 A | 4/1999 | Hall et al. | |
| 5,903,548 A | 5/1999 | Delamater | |
| 5,909,183 A | 6/1999 | Borgstahl et al. | |

(Continued)

FOREIGN PATENT DOCUMENTS

WO     WO 99/48315     9/1999

(Continued)

*Primary Examiner*—Steve M. D'Agosta
(74) *Attorney, Agent, or Firm*—Haynes and Boone LLP

(57) ABSTRACT

The invention provides a novel method for preparing a wireless environment for location determination of a wireless mobile unit, and for location determination of a wireless mobile unit. In preparing the physical environment, the invention utilizes novel techniques, including novel techniques to place transmitters, the removal of outlying data in the creation of reference RF fingerprints, and algorithms to obtain accurate reference RF fingerprints. In determining the location of a wireless mobile unit, the invention utilizes novel techniques, including novel techniques to select transmitters, the removal of outlying data in the creation of reference RF fingerprints, and algorithms to obtain accurate reference RF fingerprints.

21 Claims, 10 Drawing Sheets

U.S. PATENT DOCUMENTS

| | | | |
|---|---|---|---|
| 5,926,765 A * | 7/1999 | Sasaki ..................... 455/456.1 |
| 5,950,123 A * | 9/1999 | Schwelb et al. ......... 455/414.4 |
| 5,953,425 A | 9/1999 | Selker |
| 5,973,643 A * | 10/1999 | Hawkes et al. ............. 342/457 |
| 5,977,913 A | 11/1999 | Christ |
| 6,026,304 A * | 2/2000 | Hilsenrath et al. ....... 455/456.2 |
| 6,069,896 A | 5/2000 | Borgstahl et al. |
| 6,091,956 A | 7/2000 | Hollenberg |
| 6,263,208 B1 * | 7/2001 | Chang et al. ............ 455/456.3 |
| 6,269,246 B1 | 7/2001 | Rao et al. |
| 6,281,811 B1 | 8/2001 | Ranzino |
| 6,347,095 B1 | 2/2002 | Tang et al. |
| 6,393,294 B1 * | 5/2002 | Perez-Breva et al. .... 455/456.5 |
| 6,456,239 B1 | 9/2002 | Werb et al. |
| 6,496,701 B1 * | 12/2002 | Chen et al. .............. 455/456.5 |
| 6,529,728 B1 | 3/2003 | Pfeffer et al. |
| 6,535,132 B2 | 3/2003 | Waters et al. |
| 6,587,835 B1 | 7/2003 | Treyz et al. |
| 6,647,269 B2 | 11/2003 | Hendrey et al. |
| 6,650,902 B1 * | 11/2003 | Richton ................... 455/456.3 |
| 6,674,403 B2 | 1/2004 | Gray et al. |
| 6,728,632 B2 | 4/2004 | Medl |
| 6,782,265 B2 * | 8/2004 | Perez-Breva et al. ..... 455/456.1 |
| 6,898,415 B2 | 5/2005 | Berliner et al. |
| 6,992,625 B1 * | 1/2006 | Krumm et al. ............. 342/451 |
| 2002/0169539 A1 * | 11/2002 | Menard et al. ............. 701/200 |

FOREIGN PATENT DOCUMENTS

| WO | WO 01/37597 A1 | 5/2001 |
|---|---|---|
| WO | WO 01/43419 A2 | 6/2001 |

\* cited by examiner

|     | 101 | 201 | 301 | 401 | 501 | 601 | 701 | 801 | 901 |
|-----|-----|-----|-----|-----|-----|-----|-----|-----|-----|
| 101 | 1   | 2   | 5   | 50  | 50  | 50  | 50  | 50  | 50  |
| 201 | 2   | 1   | 2   | 50  | 50  | 50  | 50  | 50  | 50  |
| 301 | 5   | 2   | 1   | 50  | 50  | 20  | 50  | 50  | 50  |
| 401 | 50  | 50  | 50  | 1   | 2   | 5   | 2   | 5   | 50  |
| 501 | 50  | 50  | 50  | 2   | 1   | 2   | 5   | 2   | 5   |
| 601 | 50  | 50  | 20  | 5   | 2   | 1   | 50  | 5   | 2   |
| 701 | 50  | 50  | 50  | 2   | 5   | 50  | 1   | 2   | 50  |
| 801 | 50  | 50  | 50  | 5   | 2   | 5   | 2   | 1   | 2   |
| 9   | 50  | 50  | 50  | 50  | 5   | 2   | 50  | 2   | 1   |

FIGURE 10

METHOD FOR RF FINGERPRINTING

CLAIM OF PRIORITY

Pursuant to 35 U.S.C. 119(e), this application claims the benefit of U.S. Provisional Application No. 60/491,379 filed Jul. 31, 2003.

FIELD OF THE INVENTION

The claimed invention relates to location of mobile units in a wireless environment. Further, the claimed invention is a method for preparing a physical environment for location of a mobile unit.

BACKGROUND OF THE INVENTION

RF fingerprinting is a method for locating the position of a mobile unit (MU) in a wireless communication network. RF fingerprinting is described generally in U.S. Pat. No. 6,269,246.

RF fingerprinting is particularly useful in indoor settings where technologies such as GPS are typically not reliable. It works with information already available in indoor settings, such as the received signal strength indicator (RSSI or signal strength) obtainable from an IEEE 802.11 network installed to provide wireless connectivity, and does not require any additional hardware. As such, RF fingerprinting is a good technique for determining MU location in a wireless environment without requiring the installation of additional hardware.

There are several known variations in RF fingerprinting technology. Prominent examples include: 1) selection of what portion of the RF spectrum to scan; 2) different techniques for generating the RF fingerprint database; and 3) different search algorithms for determining the closest matching fingerprint.

The resolution of location determination is largely controlled by how far apart the fingerprint samples are taken. The closer they are, the higher the resolution. Of course, a person skilled in the art can appreciate that the resolution is limited by the sensitivity of the fingerprint measuring device. In addition, if two fingerprints for different locations look too much alike (e.g., due to insufficient sensitivity in the measuring device), then accuracy is lessened.

Thus, there exists a need for a method for extending RF fingerprinting to provide real-time, high resolution location estimates of a MU in a wireless communication environment. For purposes of this disclosure, "real-time" means the production of location estimates close to once per second. "High resolution" means resolution on the order of distinguishing between office cubicles (i.e., 2-3 meters) rather than between buildings. There also exists a need for a method to cope with ambiguous RF environments in which two locations that should be distinguishable are not.

Techniques included in that method should include the following: 1) techniques for preprocessing raw RF samples to derive an RF fingerprint; 2) techniques for searching for RF fingerprint matches; and 3) techniques for filtering multiple RF fingerprint matches and presenting a single best estimate.

As stated before, there exists a need to improve RF fingerprinting in ambiguous RF environments. An RF environment is ambiguous for the purposes of location determination when two distinct locations cannot be distinguished, based on their RF fingerprints, with a desired probability of success. This can happen because the sensitivity of the measuring device is insufficient to distinguish between the RF fingerprints at the locations. It can also happen because the RSSI data at one or more of the locations is relatively unstable. This means that the signal strength changes in unpredictable ways (e.g., a signal strength that is often +/−4 dBm different than recorded in the RF fingerprint).

The prior art does not address unpredictable variation, as opposed to predictable variation, such as a transmitter that powers down at the same time every day. Unpredictable variation can have many causes, such as: 1) multipath effects; 2) transitory obstacles between the MU and a transmitter (e.g., a person walking by); and 3) temporary environmental changes (e.g., a door opening and closing).

Another cause for an RF environment to be ambiguous relates to the placement of transmitters which can result in aliasing problems. Two distinct locations can have the same RF fingerprint given a particular transmitter placement. See FIG. 1 for an example. FIG. 1 is an illustration of an aliasing problem. A MU at each location on the ring around transmitter 1 receives the same strength signal from transmitter 1; each location on the ring is an alias (i.e., has the same RF signature) of all other locations on the ring. Likewise for a MU at each location around transmitter 2 with respect to transmitter 2. While adding a second transmitter usually clears up such ambiguities, not all are necessarily removed. At the two locations 3 and 4, the RF environment is indistinguishable, even with two transmitters.

There also exists a need to improve RF fingerprinting for real-time MU location determination. Real-time location determination attempts to keep track of a MU as it moves about in an environment. This has many useful applications, such as being able to offer location specific directions as a MU user moves around in an unfamiliar environment. To offer real-time location determination, location estimates must be produced relatively often (e.g., close to once per second as opposed to a couple of times per minute).

This introduces two new problems to basic RF fingerprinting techniques. First, when gathering data to generate an RF fingerprint, signals may not be observable from all transmitters used in generating the fingerprint. This can have several meanings, none of which are distinguishable at the MU. For instance, 1) the signal from the transmitter is too weak to be observed by the MU at its current location; 2) the transmitter may not be transmitting as often as the MU is observing (e.g., if a MU produces an RF signature once per second and a transmitter used in producing RF fingerprints only transmits once per second, then some RF fingerprints will not include new data for that transmitter); and 3) the transmitter may be transmitting often enough, but the signal may collide with another transmission and not be observed. Therefore, when each RF fingerprint is generated, some interpretation must be assigned to transmitters from which no signal was observed since the last RF fingerprint was generated.

For example, consider the following sequence of signal strength measurements for a particular transmitter: 47, 45, 41, 0, 43, 44, 0, 47 and 46. There are two time slices at which no signal can be observed for the transmitter (denoted by zeros for the signal strength measurement). Looking at the data before and after these time slices (and assuming that signals are being sampled relatively quickly), the inventors of the present invention, unlike the prior art, can deduce that the transmitter signal is not likely to be too weak to be observed in these time slices. In contrast to the prior art, the present invention takes into account that it is more likely that some intermittent problem has temporarily prevented the transmitter's signal from being observed.

On the other hand, consider the following sequence: 20, 18, 0, 16, 14, 0, 0, 5, 0, 0, 0 and 0. While the inventors of the present invention could similarly deduce that the first time slice in which the signal could not be observed is likely to be due to an intermittent problem, the subsequent time slices in which the signal could not be observed are more likely to be due to the transmitter's signal being too weak. The present inventors base this conclusion on the consistent weakening of the signal, which is likely to represent movement away from the transmitter, and the longer sequence of consecutive time slices in which the transmitter's signal could not be observed. Such techniques are not described in the prior art.

The second problem related to producing frequent location estimates is that producing a new location estimate each time a new RF fingerprint is generated can result in a jittery series of estimates. When a rapid series of changing location estimates is presented to a user, the user's confidence in the estimates drops significantly. Two examples of such jitter problems are shown in FIG. 2 and FIG. 3. In FIG. 2, a user is standing between locations 10 and 20. In such a situation, a bad series of estimates would jitter between 10 and 20, with no stability at either location. In FIG. 3, the user is standing near locations 10a and 30a. This is similar to FIG. 2 in which jitter between 10 and 20 would be unreliable, but user confidence would be even lower because it is physically impossible to move back and forth through the wall 40a having a door 50a separating the locations. Thus, there exists a great need to resolve said jittery estimates.

SUMMARY AND OBJECT OF THE INVENTION

In a preferred embodiment, the invention is a method of preparing an area for location determination of a mobile unit which provides at least two transmitters that are consistently detectable by a mobile unit at locations in the area. In another embodiment, the invention is a method for preparing an area for location determination of a mobile unit by providing at least two transmitters that are located along different axes with respect to a plurality of locations in said area.

Another step in the method is collecting RF data of the mobile unit at said locations in said area. The invention assigns a unique reference RF fingerprint for each of the locations based on the collected RF data for each of said locations. In another embodiment, reference RF fingerprints are also created for a specific orientation.

The above method applies mathematical functions to collected RF data in assigning reference RF fingerprints, for example, the invention provides for the averaging of the collected data respective to each location to obtain an average and assigning a reference RF fingerprint respective to each location based each respective average.

The invention provides a novel step by interpreting the RF data for missed transmissions and assigning unique reference RF fingerprints based on the interpreted data. The method also determines if any of the collected data is outlying. If so, the invention may not consider said outlying data in creating a reference RF fingerprint.

The invention uses similar techniques to determine a location of a mobile unit in an area configured for wireless location determination of said mobile unit. The invention does so by collecting samples of RF data of a mobile unit at said location; applying a mathematical function to said samples to obtain a value that is used as an RF fingerprint; and determining the similarity of said RF fingerprint to location specific data. The novel application of said mathematical function is described partially above and in the detailed description of the preferred embodiment below. The method of determining a location of a mobile unit in an area configured for wireless location determination of said mobile unit further comprises selecting RF samples based on a rule. Those rules will be described below and are embodied within the scope of the appended claims.

It is an object of the present invention to prepare a physical environment for location determination of a mobile unit in such a way that will increase the accuracy of reference fingerprints used to provide location estimates for a mobile unit.

It is a further object of the invention to accurately report the location of a mobile unit in a wireless environment.

Other objects and embodiments of the invention are described below. It is to be understood, however, that the invention is not to be limited to the disclosed embodiments, but on the contrary is intended to cover various modifications and equivalent arrangements included within the spirit of the scope of the appended claims.

BRIEF DESCRIPTION OF THE DRAWINGS

FIG. 10 shows transition matrix according to an embodiment of the present invention.

DETAILED DESCRIPTION OF THE PRESENTLY PREFERRED EMBODIMENT

The claimed invention is directed to location of mobile units in a wireless environment and to preparing a physical environment for location of a mobile unit. The preparation of the physical environment is referred to herein as the survey process, while the actual location of the mobile unit in the physical environment is referred to as the run-time process. In each of these processes, the claimed invention provides techniques. Some techniques are particular to the survey process, while others are particular to the run-time process, while still other techniques are relevant to both the survey process and the run-time process.

Figure 1:
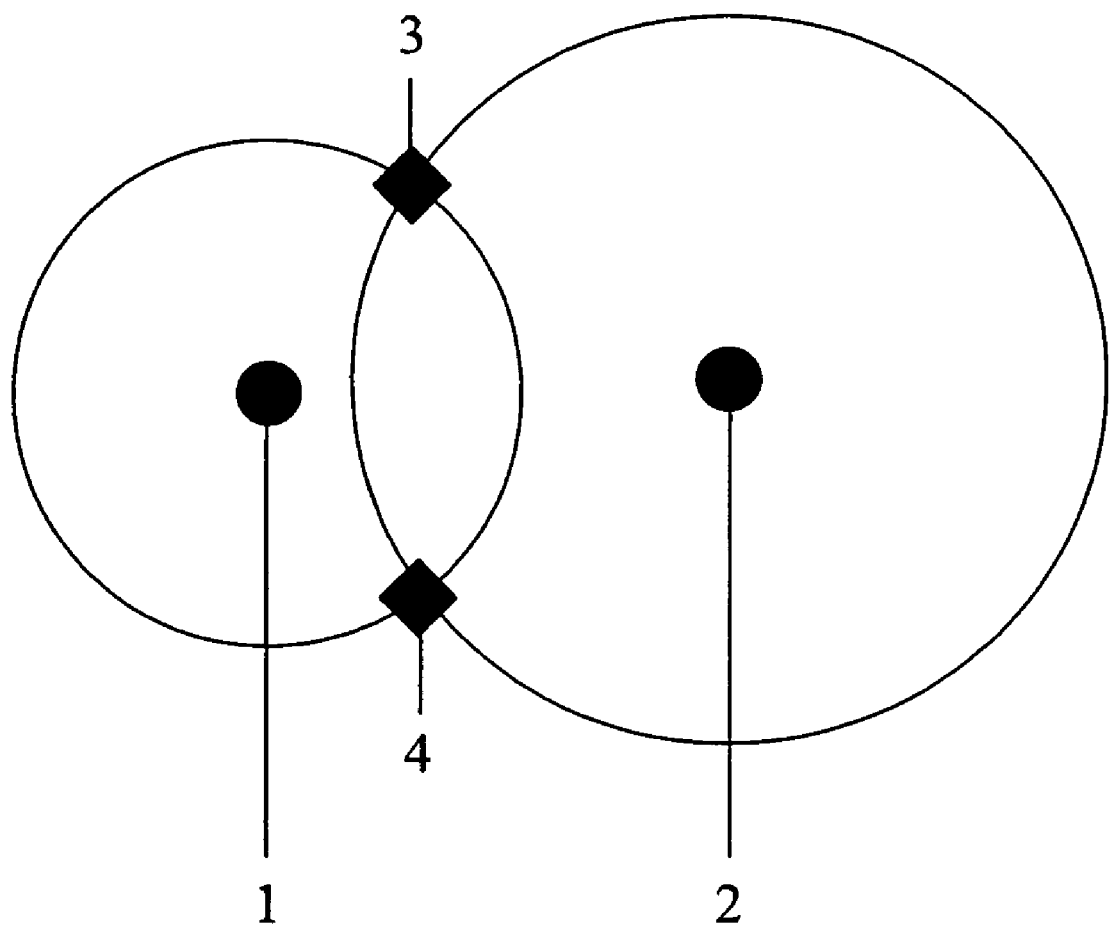
FIG. 1 is an illustration of an aliasing problem solved by the present invention.
Figure 2:
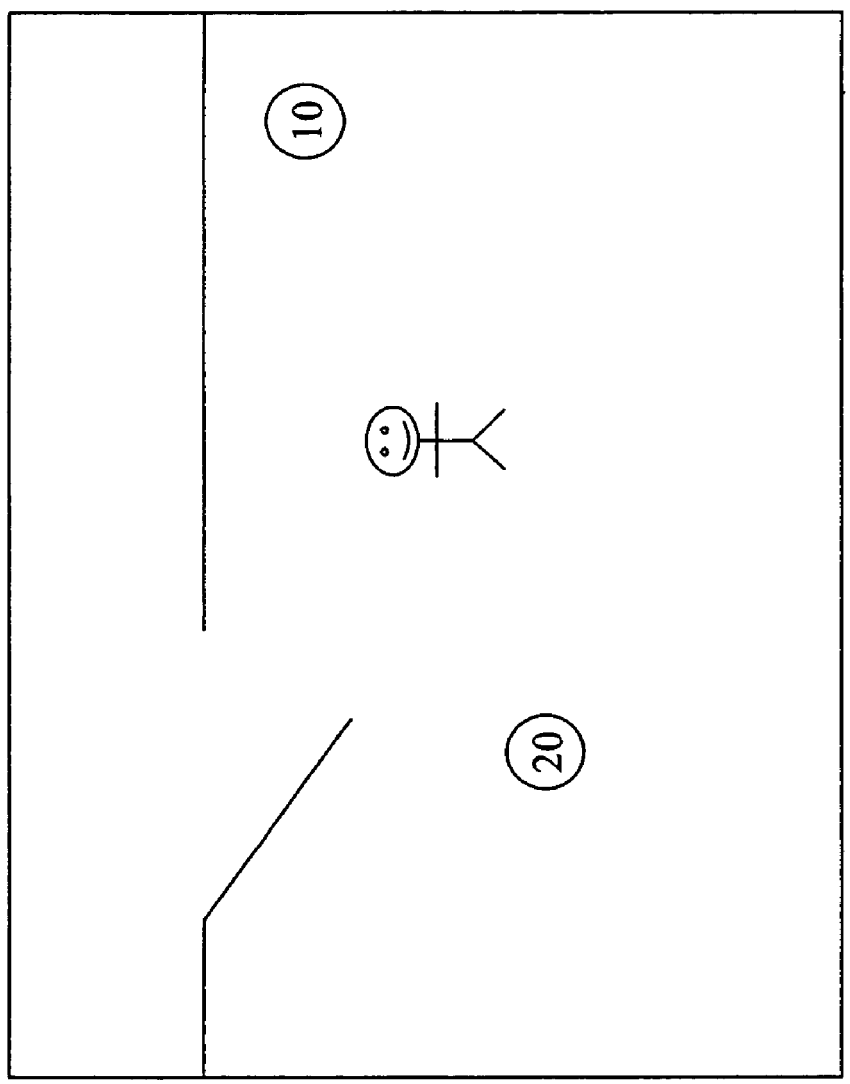
FIGS. 2 and 3 show examples of inaccurate location estimation caused by jitter problems, which are solved by the present invention.
Figure 3:
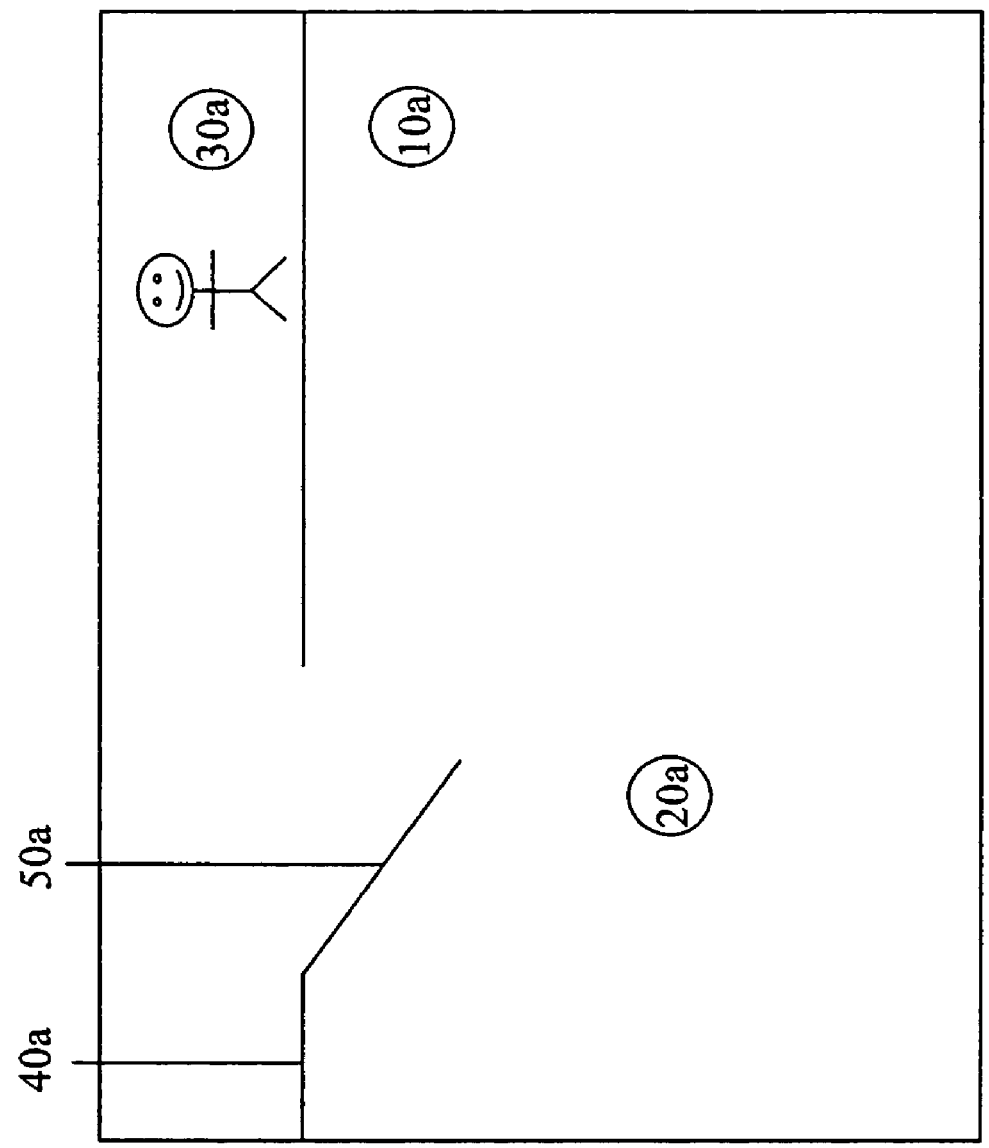
Figure 4:
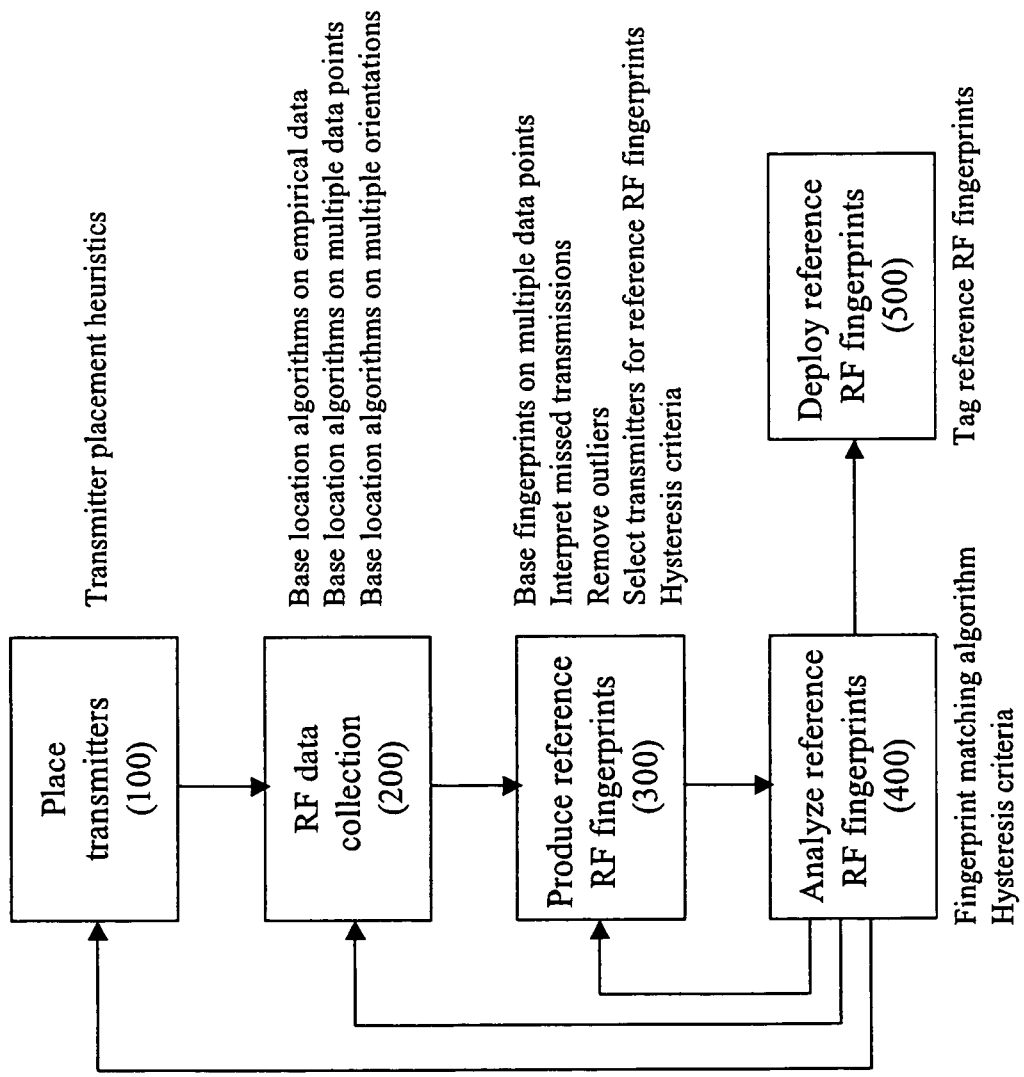
FIG. 4 shows a high-level overview of the survey process used to prepare a physical environment for location determination according to an embodiment the present invention.

A high-level overview of the survey process used to prepare a physical environment for location determination is shown in FIG. 4. Each step is annotated with the techniques that are applied during that step in the survey process.

As shown in FIG. 4, the first step is to place transmitters 100. Typically when placing transmitters to wirelessly enable an environment (e.g., when placing IEEE 802.11 access points or APs), the primary concern is coverage. When only coverage is considered, a MU should be able to receive a signal from at least one AP anywhere within the environment. For location determination, placement of a minimal number of APs that ensures coverage is usually insufficient.

Once transmitters are placed, RF data collection 200 is performed. A MU is taken to various planned locations in the environment. At each location, RF samples are taken and recorded. Each sample records information about the RF environment (e.g., signal strength of transmissions from various sources) and is associated with a timestamp and location.

The data is then used to produce RF fingerprints 300. 300 cleans up the data that was gathered in RF data collection 200 and produces an amalgam of the data. Then a selection is made as to which transmitters found in the data are best suited to represent the location. For example, two actual physical locations may exhibit RF data from the same AP. If the two locations exhibit the same or highly similar RF data from that AP, that RF data is not useful in distinguishing the locations. But if the locations exhibit distinguishable RF data for the same AP, that data will be selected to represent one or both of the locations. The result is a set of data corresponding to a subset of the observable transmitters that are associated with the location. RF fingerprints produced in this process are called reference RF fingerprints.

Once reference RF fingerprints have been produced, algorithms are run to analyze the RF fingerprints 400. The fingerprints are compared to a set of data that is also associated with locations. A run-time location determination algorithm is simulated against the data set. The results are compared to the locations associated with the fingerprints. This results in accuracy and resolution statistics for the reference RF fingerprints as compared to the data set used in analysis. The data set can be that which was used in producing the reference RF fingerprints, or an independent set of data. This analysis has obvious benefits: changes to RF fingerprints can be tested quickly without affecting a live deployment. And, iterative techniques that apply a change and measure the results can be automated and do not require successive changes to an installed RF environment, multiple trips back and forth to a physical environment for testing, or multiple system restarts to reload RF fingerprint data.

If the accuracy and resolution statistics do not meet location determination requirements, several options are available depending on how well or poorly the analysis results match the requirements. Those options are as follows: 1) producing a new set of reference RF fingerprints using the same data set and a different set of configuration parameters; 2) collecting a new set of data, or collecting additional data to add to the existing data set; or 3) adding or removing transmitters.

When satisfied with the results of the analysis, the reference RF fingerprints are deployed 500 to the computing infrastructure used to support location determination in the environment. This infrastructure could be a server that delivers reference RF fingerprint information to MUs, or it could be the MUs themselves.

Over time, changes in the RF environment may require revisiting this process. For example, if a permanent environment change affecting RF propagation were made (e.g., taking down a wall or moving a large metal shelf), then the RF data collection step should be repeated, possibly followed by the subsequent steps. In general, however, this process will be conducted infrequently.

Figure 5:
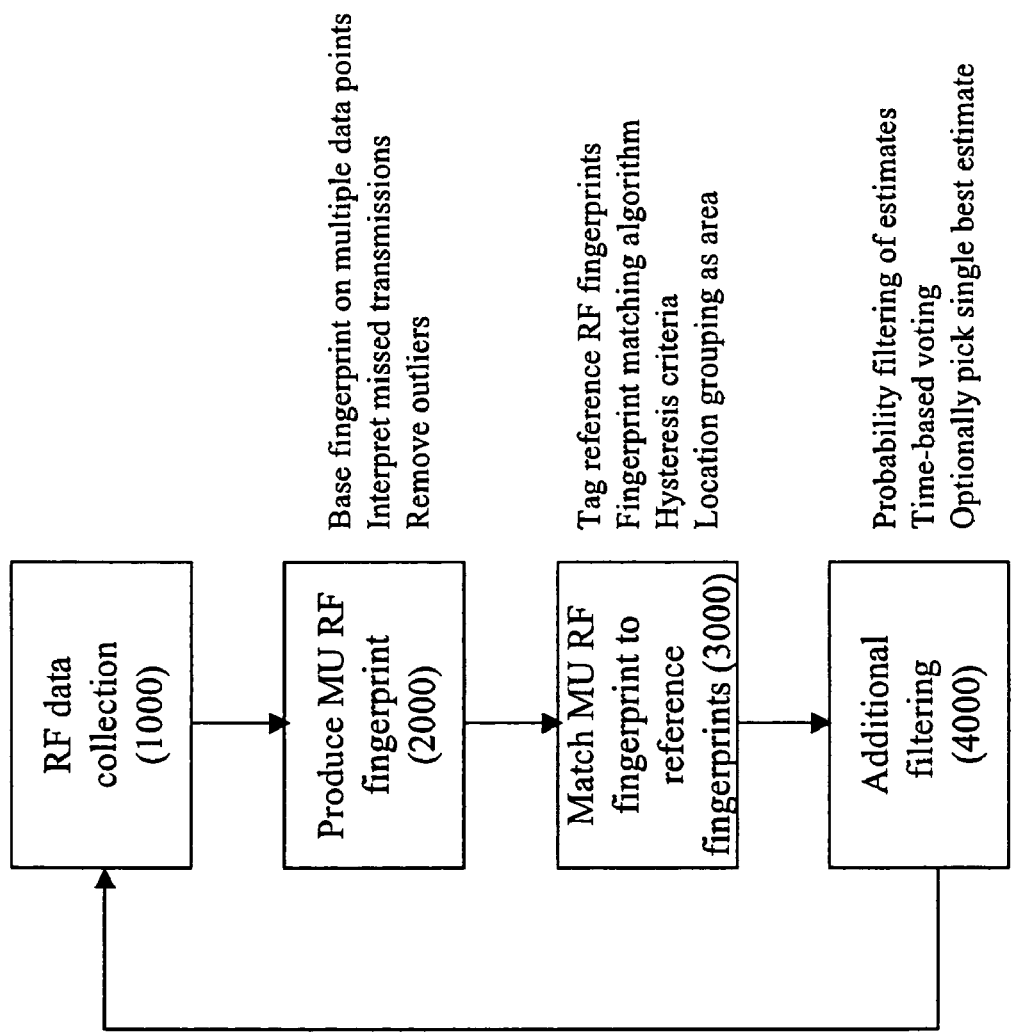
FIG. 5 shows a high level overview of the run-time process used to estimate the location of a MU in a wireless-enabled physical environment according to an embodiment of the present invention.

A high level overview of the run-time process used to estimate the location of a MU in a wireless-enabled physical environment is shown in FIG. 5. Each step is annotated with the techniques that are applied during that step in the run-time process. This process represents an iterative process that is conducted as long as a MU is in a wireless environment and location determination is desired. Each iteration is referred to as a time slice. It begins each time the MU begins observing the RF activity in its environment and concludes when a location estimate is made for the MU.

As shown in FIG. 5, the first step is to collect RF data 1000. The MU observes the RF environment for some period of time to gather signal strength data. This is the same type of data that is gathered in the survey process. It is important to note that in many cases a MU cannot always observe the RF environment. For example, a MU equipped with an 802.11 radio can only use the radio for one purpose at a time. It can either transmit information or receive information. When it receives information, such as periodic beacons from APs, it records information (like received signal strength) that can be used for location determination. In each time slice, the MU gathers one measurement for each transmitter that it observes during that time slice.

For each time slice, the data is used to produce a MU RF fingerprint 2000. Some preprocessing is performed to clean up the data, some of which is dependent on data from previous time slices. This RF fingerprint, unlike the reference RF fingerprints produced in the survey process, preferably retains information for all observable transmitters. An RF fingerprint produced at run-time is called a MU RF fingerprint.

The MU RF fingerprint is compared or matched to the reference RF fingerprints 3000 produced in the survey process. A set of location estimates is determined based on the reference fingerprints and criteria associated with them.

Finally, some additional filtering 4000 may be performed to refine the set of location estimates that has been produced, depending on the needs of the application using the location estimates. Two techniques included in this method are:
  using a location transition graph to define which transitions are more probable and which are impossible; and
  using a time based voting algorithm to pick a single best estimate.

Whether additional filtering 4000 is performed or not, at the end of each time slice a set of location estimates is provided to the party requesting location determination information.

The following subsections describe the techniques applied during either the survey process, the run-time process, or both.

The invention comprises techniques to place wireless transmitters or access points. This technique is used only in the survey process. To enhance location accuracy and stability, "strong" signals from at least two or three wireless access points should be detectable at each location in the environment. "Strong" signals are those which are consistently detectable (i.e., missed transmissions, discussed in the below section, are infrequent). Ideally, wireless access points should be located along different axes with respect to as many locations as possible to cope with aliasing. Such a placement results in the strength of the signals from one of the access points increasing and the strength of signals from other access points decreasing as a MU moves.

Figure 6:
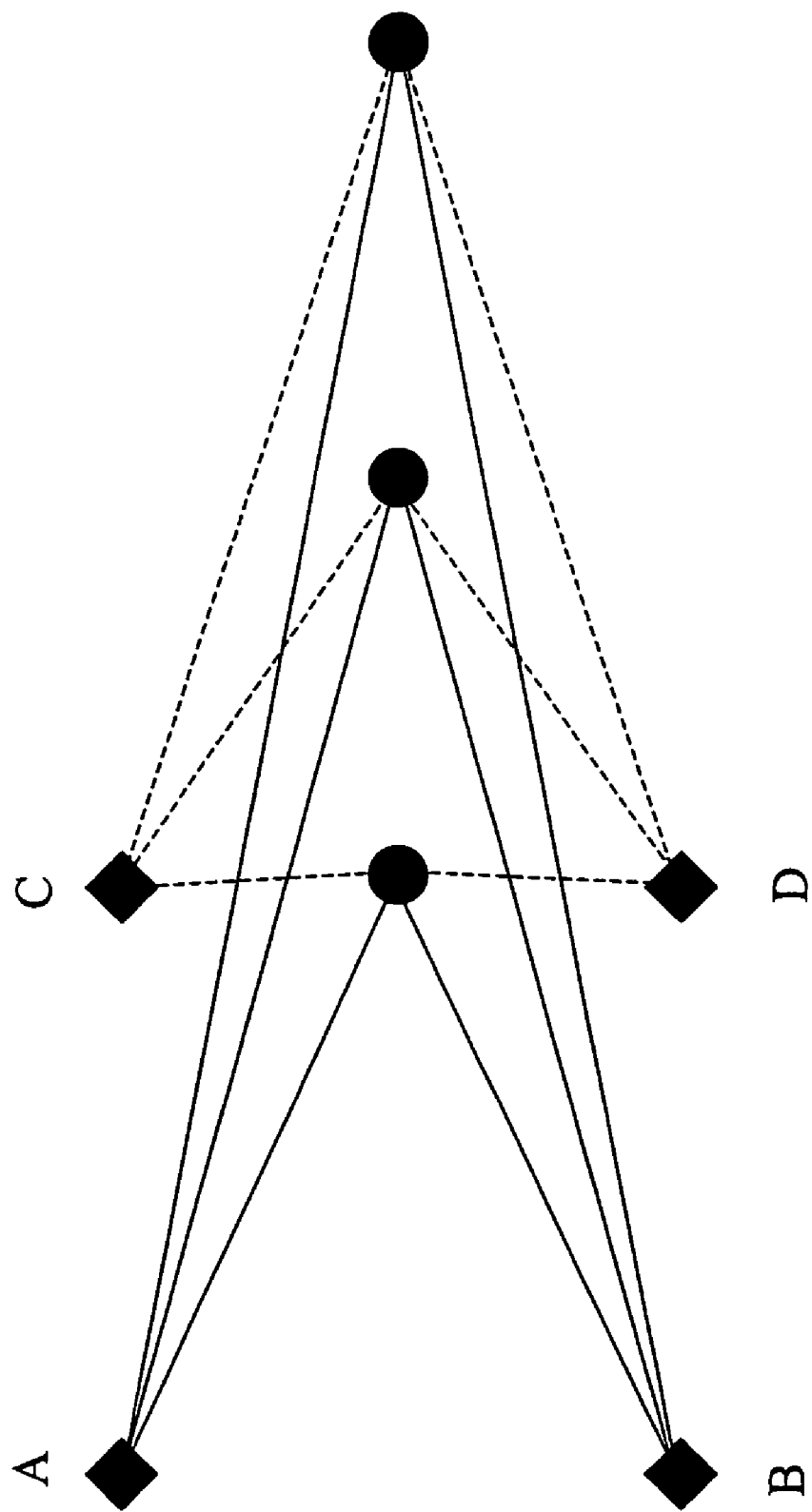
FIG. 6 shows the implications of poor wireless access point placment, which are remedied by the present invention.

FIG. 6 shows the implications of poor wireless access point placement. Wireless access points are shown as solid circles; MU locations are shown as solid diamonds. Due to poor placment, MUs at locations A and B are indistinguishable (aliases of each other) as the distance to each of the three access points is indentical (implying a corresponding relationship to RF data at the locations). A similar problem will exist for MUs at locations C and D, or any other pair of locations equidistant from the axis along which the wireless access points are deployed.

In the survey process, location estimates are based on empirical RF data collected using a MU at the physical environment. Each set of RF data is associated with specific locations in the physical environment. Interpolation and RF signal propagation models are not used to estimate what RF data should look like at locations at which data was not collected. This is due to the relative instability of RF data over short distances due to issues such as multipath effects. Additionally, in an embodiment where the invention targets locations placed relatively close together (i.e., 2-3 meters apart), intermediate locations vary little from mapped locations and the difference plus or minus the RF variation would make interpolated intermediate locations indistinguishable.

RF data is expressed in terms of received signal strength indicators ("RSSI") in a wireless environment. More specifically, the strength of signals received from wireless access points located in the physical environment is the source of RF data. This is due to several practical reasons, some of which are as follows: 1) wireless access points are already deployed in the environment, lowering deployment cost; 2) wireless access points are non-mobile, installed at known locations, and are moved infrequently; and 3) RSSI data can be easily gathered using the same types of MUs whose locations are to be estimated, resulting in data that most closely matches that observed by MUs at run-time (e.g., because the same type of antenna is used).

One technique for dealing with relatively unstable RF environments that is used in both the survey and run-time processes is basing a fingerprint on multiple data samples. Averaging signal strength over the last N samples results in a more typical signal strength reading, for a large enough N. This technique deals with small scale, brief variation.

When gathering data for reference RF signatures, a comparatively large number of samples (e.g., 15-30) is taken at each location. During the preprocessing step, these values will be averaged (preferably after outliers are removed and missed transmissions are interpreted). By gathering more data, representing the location over a longer period of time, a more characteristic reading can be produced. For example, the effects of a pedestrian walking by while gathering data will be averaged out.

When gathering data for MU RF signatures, the same technique is applied, but over a smaller number of samples (e.g., 2-4). Averaging is performed to deal with the same small scale, brief variations. The number of samples is typically smaller, however, since the MU may be moving. For a moving MU, each additional sample included in the average introduces a lag effect. For example, if six samples were included in an average, and samples were collected once per second, then a given location estimate would include data for where the MU was located six seconds ago. In a highly mobile setting, this degree of lag may be intolerable.

The number of samples averaged in each process is configurable, and may vary in different settings and for different use cases. The value of N is based on the anticipated MU movement rate for the physical environment in which location estimates are desired. The choice of N is a tradeoff between how quickly a new location is estimated once a MU moves there, and how unstable (inaccurate or frequent location estimate changes) the location estimates are. If MUs move quickly, a small N may be used so that location estimate changes keep up with physical location changes. If MUs move slowly, a large N may be used so that location estimates are more stable and change infrequently.

Preferably, averaging is applied after other preprocessing steps (i.e., outliers are removed and missed transmissions are interpreted). When preprocessing steps remove a data point, data is removed on a per (transmitter, sample) pair basis. Data for other transmitters in the same sample is not necessarily removed as well.

One technique for dealing with relatively unstable RF fingerprints due to transitory obstacles is to record an RF fingerprint for each of several orientations of a MU at a location. This technique is used in the survey and run-time processes. Specifically, this technique is used to deal with the case in which the transitory obstacle is the MU user. When standing at a given location, a MU user may turn around, placing his or her body between the MU receiver and a transmitter.

To compensate for this phenomenon, the invention collects data for a location at each of several orientations. Data for each different orientation is processed independently (e.g., it is not averaged together), generating one reference RF fingerprint per orientation. Consequently, a location is associated with one or more reference RF fingerprints.

Preferably, orientation is not a concept that factors into producing a MU RF fingerprint. When matching a MU fingerprint to reference fingerprints, a location is considered a location estimate if the MU fingerprint matches any of the reference fingerprints for that location.

Orientation can be used to deal with multiple axes of signal differentiation. The most obvious axis is directional; for example, whether the MU user is facing North, South, East, or West. Another useful axis is elevation; for example, whether the MU user is standing or sitting. Orientation can be used in any case in which there are several different positions a MU user can be in that would result in noticeably different RF fingerprints.

Additionally, orientation information could be used when producing a MU RF fingerprint to improve the accuracy of location estimates. Orientation can be used as input to a fingerprint matching algorithm such that locations in the direction of the current MU orientation are more likely transitions. This technique is best combined with probability filtering of estimates (see later section).

Another technique, which is used both in run-time and the survey process is to interpret missed transmissions. When a given transmitter has not been observed in the current time slice or scanning period, it can be interpreted in one of two ways. It either means that the transmitter's signal cannot be detected by the MU or that the transmitter did not send a recognizable signal during the time slice. From the perspective of the MU, these cases cannot be distinguished.

Therefore, an embodiment of the invention uses an algorithm to predict which interpretation is more likely given recent history. If a transmitter has not been observed in the last N time slices, we interpret the transmitter as being out-of-range. If a transmitter has been observed in the last N time slices, but is not observable in the current time slice, we interpret the transmitter as being temporarily unobservable.

The purpose of this step of the invention is to avoid prematurely considering a transmitter out-of-range when it may only be temporarily obscured or not have transmitted during the current time slice. Requiring N consecutive time slices without an observed signal will eliminate cases in which the transmitter is not transmitting as often as the MU is observing, provided a sufficiently large value is used for N.

In the preferred embodiment, interpreting missed transmissions occurs before averaging a number of samples. The combination of interpreting missed transmissions and averaging a number of samples therefore involves two independently tunable parameters: (1) the number of samples to average; and (2) the number of consecutive missed transmissions required to consider a transmitter out-of-range.

Figure 7:
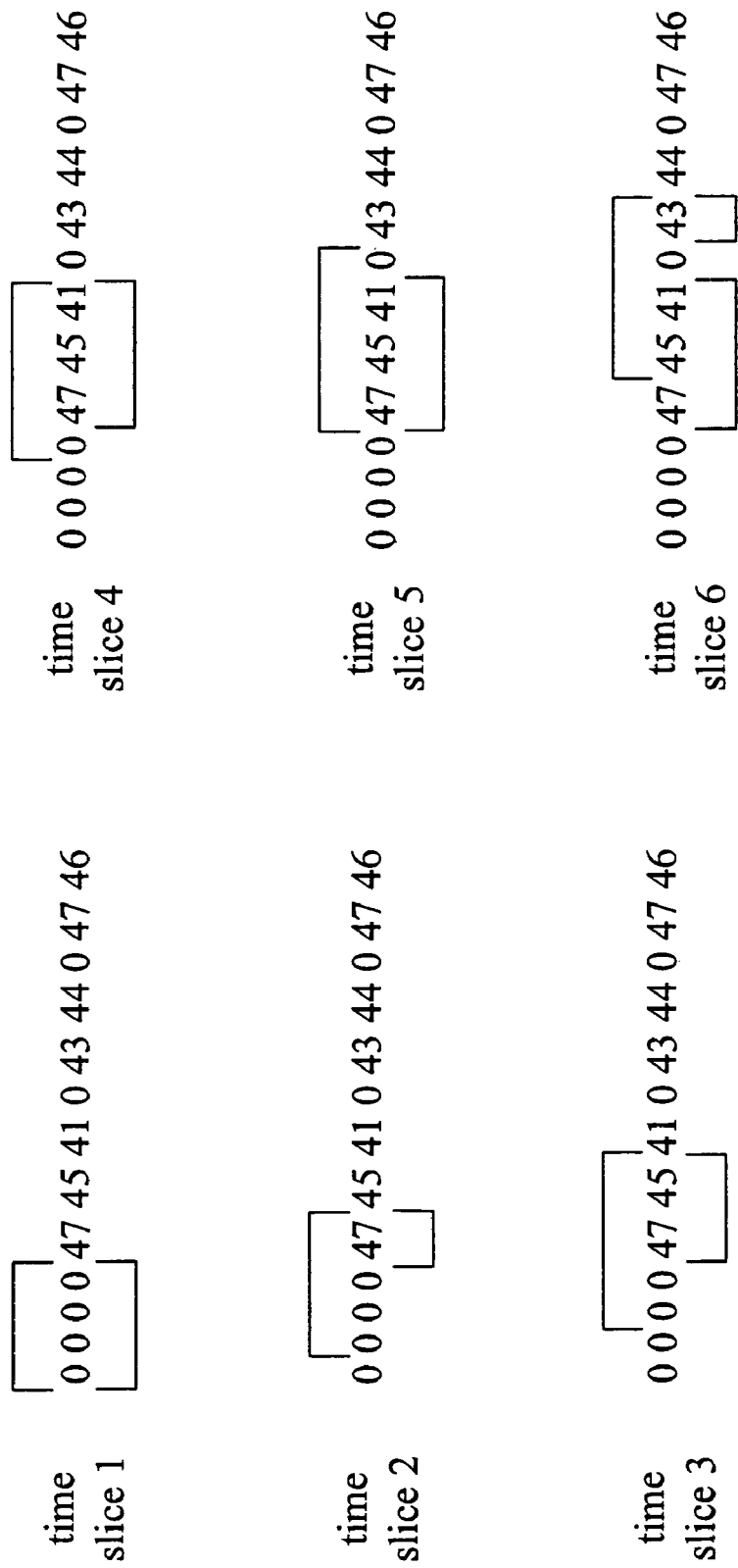
FIG. 7 illustrates the application of an algorithm designed to provide for more accurate reference RF fingerprints and location estimates according to an embodiment of the present invention.

When producing a MU RF fingerprint, a transmitter signal interpreted as temporarily unobservable results in the last N observed samples being used in averaging. FIG. 7 illustrates the results of this algorithm for a particular sequence of transmitter signal strength data and N=4. FIG. 7 illustrates how the algorithm determines the average signal strength value for the transmitter at six different time slices. For each time slice, two bars are shown. The bar above the sequence of signals shows the signal strength of the last N observed signals; if a signal from the transmitter was not observed, a zero is recorded. The bars below the sequence of signals show the signal strengths that are used in computing the average.

At time slice 1, the transmitter has not been observed in the last N time slices, and so the transmitter is considered unavailable. At time slice 2, the transmitter has only been observed once. The average is therefore the only observed signal—47. If the zeros were included in the average, the average would be 11.75—quite far from the value that was actually observed. At time slice 3, the transmitter has been observed twice. These two signals are used in the average, yielding an average of 46. Again, if zeros were included in the average, the result would be 23. At time slice 4, the transmitter has only been observed three times. Only these three signals are used in the average, yielding an average of 44.33. Again, if zeros were included in the average, the result would be 33.25, which is still far from what has actually been observed. During time slice 5, the transmitter is not observed. But because the transmitter has not been observed only one time in the last four time slices, it is determined that the transmitter is temporarily unobservable. Consequently, the invention averages the last N observed signals. Note, however, that the transmitter has been observed only three times, and so the average is calculated from only those three values, yielding a figure of 44.33.

Finally, at time slice 6, the transmitter is observed. The average is calculated from the last N observed signals, yielding an average of 44. Note that one of the observed signals is not from one of the last N time slices. The benefits of averaging a full N data values are that the effects of temporary variations are more likely to be minimized due to averaging over a larger set of data. This is unlikely to cause problems due to "stale" data, as the duration of a time slice and the value of N are both tunable parameters. In the worst case, a signal strength from a time slice that is 2*(N-1)* (time slice duration) units in the past will be used. Putting this in context, consider a time slice duration of 2.0 seconds and N=3. In this case, data that is at most 8 seconds old will be included in the average.

When producing reference RF fingerprints, a transmitter signal interpreted as temporarily unobservable is simply discarded from the data set before averaging. Several alternate embodiments involve other treatments, including the following: 1) establishing criteria such that if the transmitter is observable in more than X% of the samples, each unobservable sample is removed from the set to be averaged for that transmitter; 2) establishing criteria such that if the transmitter is not observable in more than X% of the samples, the transmitter is considered out-of-range; and 3) establishing criteria such that if the transmitter is not observable in more than X% of the samples, each case of an unobservable transmitter is considered out-of-range (e.g., it is considered to have a signal strength of zero).

One technique for dealing with relatively unstable RF fingerprints used in the survey and run-time processes is to remove outlying measurements during preprocessing and before averaging. Averaging multiple samples is effective in producing a more characteristic RF fingerprint, but is even more effective when blatantly uncharacteristic samples are removed before averaging.

For example, consider a scenario in which the last ten signal strength readings for a particular transmitter were: 33, 35, 34, 36, 34, 34, 34, 35, 12, and 36. An average of these values without removing outliers is 32.3. However, the reading of 12 is out of place in this data set. If that point is removed as an outlier, the average would be 34.56, much closer to the majority of readings. This effect worsens as a smaller number of samples are averaged.

This type of signal difference is somewhat common in practice. A door opening and closing could cause this type of difference. Removing outlying readings is an attempt to deal with this type of large scale, brief variation.

Several techniques can be used to remove outliers prior to the calculation of the mean including removing readings lying outside N standard deviations of the average or removing readings more than N units from the average.

In the survey process, when defining a reference RF fingerprint for a location, RF data for some set of transmitters must be selected as source data. In doing so, two questions must be answered: (1) how many transmitters should be included?; and (2) which transmitters should be used?

Using a small number of sources (e.g., 2-4) is ideal for several reasons.

The converse, using all transmitters for which there is data for the location, is not necessarily ideal because this decreases the accuracy of location estimates. This is because additional transmitters result in a larger number of dimensions along which a reference RF fingerprint can differ from a MU RF fingerprint during fingerprint matching (see fingerprint matching algorithm section). This larger potential difference requires that a larger buffer zone (see hysteresis criteria section) be used to allow each of the transmitters to fluctuate by an acceptable amount.

Including too few transmitters (e.g., just one) also decreases the accuracy of location estimation. There are two reasons why including too few transmitters decreases accuracy. First, aliasing problems are more common when a small number of transmitters is used. In the degenerate case, when just one transmitter is used, the RF environment effectively consists of a series of concentric circles, and all locations on each circle are indistinguishable from each other. Second, with a small number of transmitters, the effects of transitory obstacles (e.g., a passerby or a MU user between the MU and a transmitter) are greater. Transitory obstacles weaken the received signal at the MU, causing a location that is farther away from the transmitter than the MU to be given as an estimate. As the number of transmitters increase (assuming that not all transmitters are obscured), the percentage of transmitters that are a good match increase.

Using two to four transmitters for each reference RF fingerprint is thus preferable. This range is large enough to avoid aliasing, but small enough to permit minor variation for each transmitter without permitting a bad match to be given as an estimate.

Each transmitter that is included in a reference RF fingerprint for a location should meet the following criteria: 1) the transmitter is detected in a high percentage of the data samples taken at the location (e.g., >80%) (referred to as an incidence of detection); or 2) there is a low variance in the signals detected for the transmitter in the data samples taken at the location (e.g., the standard deviation is within X units).

Often, this means leaving out signals that are on the extremes of the signal strength vs. distance curve. Signals on the high end of the curve can have a high variance over a small distance. Signals on the low end of the curve tend to have a higher percentage of missed signals.

An iterative algorithm is used to find a small set of transmitters to include that distinguishes the reference RF fingerprint for a location from as much as possible of the sample data taken at other locations (using simulation of the run-time location determination algorithms).

The algorithm works as follows:

1) Begin with an empty set of transmitters that will be used to define the reference RF fingerprint for a location.

2) Add a transmitter to the reference RF fingerprint such that the reference RF fingerprint is distinguished from the RF sample data for the largest number of other locations. The criteria for distinguishing the reference RF fingerprint from RF data is that the reference RF fingerprint will not be considered a valid location estimate given the RF data for other locations (i.e., it would not be considered a valid estimate when at those other locations).

3) If there are still locations that are not distinguished from the reference RF fingerprint's location, repeat step 2 unless the maximum number of transmitters has been reached.

It should be noted that if aliasing persists after adding several transmitters to a reference RF fingerprint, it may be productive to add a transmitter that is not visible (i.e., no signal is detected) at the location for which the RF fingerprint is being created, but is visible at the location alias. This will ensure the location is not a match when the MU is physically present at the (otherwise) aliased location.

The above algorithm is extended in cases in which collections of locations, known as areas, are the desired level of location estimation (i.e., cases in which areas should be distinguished, but locations within areas do not have to be distinguished). Step 2 is modified such that only comparisons between locations in different areas are relevant when counting how many distinctions are given by adding a particular transmitter.

The invention utilizes a fingerprint matching algorithm in both the survey and run-time processes. Each time slice a fingerprint matching algorithm compares the MU RF fingerprint to a list of reference RF fingerprints. The goal is to find reference fingerprints that are "close enough" in order to represent an estimate of the location of the MU. Each comparison of a MU fingerprint to a reference fingerprint results in a measure of closeness; lower measures represent closer matches.

The exact nature of calculating a measure varies depending on what information (e.g., signal strength measures) is used in comparing RF fingerprints. Given an RF fingerprint that is defined as a function from transmitters to signal strength measurements and variables MU and ref representing the MU RF fingerprint and the reference RF fingerprint respectively, one such definition of a measure is:

$$measure = \sqrt{\sum_{t:dom(ref)} (MU(t) - ref(t))^2}.$$

If only a single value is used to determine whether the resulting measure is "close enough", the location estimate will fluctuate between "in" and "out" as RF signals fluctuate. To avoid this problem, hysteresis is introduced. Hysteresis is "the lagging of an effect behind its cause". The invention introduces such a lag to accommodate normal RF signal fluctuation.

In this way, the invention ensures that an estimate is sufficiently reliable before that information is passed on to the user of location determination services. Further, before ceasing to consider a location as an estimate, the invention ensures that the match criteria have degraded beyond a certain point. The criteria for becoming a match and ceasing to be a match are separated by a margin that is large enough to accommodate minor variations, and small enough to not consider a very bad match to be a valid location estimate. Whether or not a location is considered a valid location estimate is given by the following algorithm, applied once per time slice:

1) If the location was not previously a location estimate and the measure is less than the entry cutoff for the reference RF fingerprint, then the location is now considered a location estimate for the MU.

2) If the location was previously a location estimate and the measure is less than the exit cutoff for the reference RF fingerprint, then the location is still considered a location estimate for the MU.

3) If the location was previously a location estimate and the measure is greater than or equal to the exit cutoff, then the location is no longer considered a location estimate for the MU.

In some settings, even this approach leaves too much jitter or imprecision in terms of location estimates. For example, in a large, open space, it may be necessary to define an area in terms of numerous individual locations, rather than using a single large location with large cutoffs.

Figure 9:
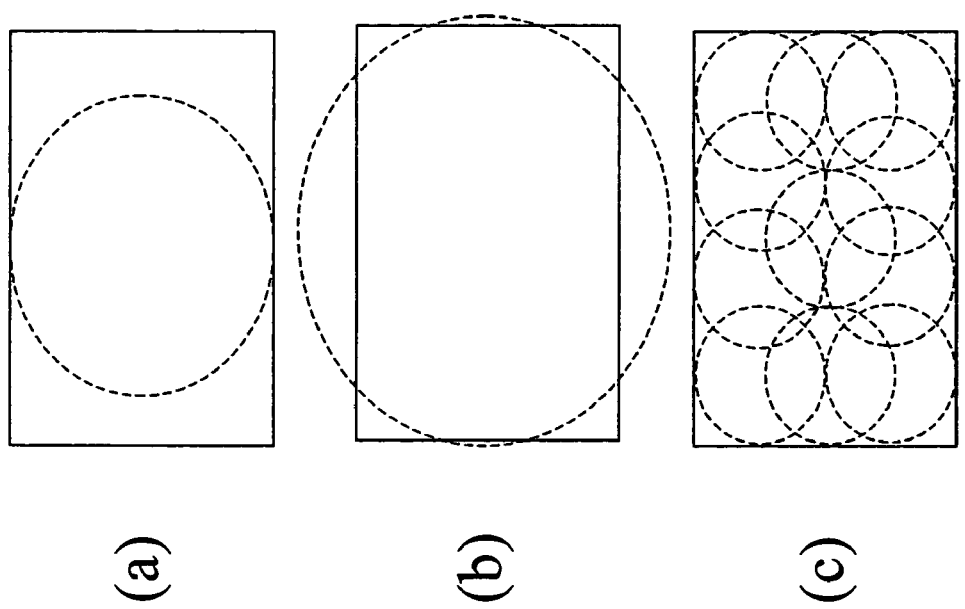
FIG. 9 shows the results of setting different cut-off's for location determination according to an embodiment of the present invention.

Consider the three approaches illustrated in FIG. 9. The approach in 9(a) uses a single location to approximate the rectangular physical area. By making the cutoffs for the location sufficiently small that points outside the room are not estimated to be within the room, significant areas within the room are also not considered within the room (those areas within the rectangle, but outside the dashed oval). The approach in 9(b) raises the cutoffs such that most points within the room will be estimated to be within the room; however, this is at the cost of estimating the room to be the location of points outside of the room.

The approach in 9(c) makes up for the weaknesses of the previous approaches by defining the area (the room) in terms of several, overlapping locations. The collection of overlapping locations more completely and precisely approximates the physical area of the room. However, jitter is now a potential problem. If the locations were not grouped into an area, then location estimates might jump between overlapping locations in unexpected ways (e.g., by skipping over intermediate locations due to cutoffs).

Instead, the location estimate is considered in terms of the area, rather than its constituent locations, thereby making the area the unit of a stable location estimate. Thus, the area's RF reference fingerprint now encompasses the collection of locations comprising the area. Entry and exit cutoffs are values that apply to the area. These areas are also referred to as sub-areas.

The algorithm for determining whether or not an area is considered a valid location estimate is given by the following algorithm, applied once per time slice:

1) If the area was not previously an estimate and the measure for any location within the area is less than the entry cutoff, then the area is now considered a location estimate for the MU.

2) If the area was previously a location estimate and the measure for any location within the area is less than the exit cutoff, then the area is still considered a location estimate for the MU.

3) If the area was previously a location estimate and every location within the area has a measure that is greater than or equal to the exit cutoff, then the area is no longer considered a location estimate for the MU.

In some cases, it's useful to know both which area is a location estimate, as well as which location within the area is a location estimate. The above algorithm handles the question with regard to areas. The following algorithm is used (usually in conjunction with the above) to determine whether or not a location is considered a valid location estimate, when the location is part of an area:

1) If the area was not previously a location estimate, the measure for the location is less than the entry cutoff, and no other location in the area has a smaller measure than the location, then the location is now considered a location estimate for the MU.

2) If the area was previously a location estimate, the location was not a location estimate, the measure for the location is less than the entry cutoff, no other location in the area has a smaller measure than the location, and the location that was previously a location estimate now has a measure that is greater than or equal to the exit cutoff, then the location is now considered a location estimate for the MU.

3) If the location was previously a location estimate and the measure for the location is less than the exit cutoff, then the location is still considered a location estimate for the MU.

4) If the location was previously a location estimate and the measure for the location is greater than or equal to the exit cutoff, then the location is no longer considered a location estimate for the MU.

Each time slice, the fingerprint matching algorithm indicates which locations and/or areas are considered location estimates for the current time slice. Multiple locations and/or areas can be considered location estimates for any given time slice; there is no restriction that at most one location or area can be considered a location estimate.

The reasoning for this is to produce a collection of reasonable estimates, rather than a single "best" estimate. This approach allows for more flexibility. For example, two different algorithms could be used by two different applications to pick a best estimate from the collection of reasonable estimates. Another approach would be to use an algorithm that chooses whether to present a single best estimate or a collection of reasonable estimates based on some measure of confidence in the calculated best estimate, essentially degrading resolution in the presence of uncertainty. By leaving the possibilities open in the initial fingerprint matching step, multiple options can be exercised in subsequent processing steps.

A reference RF fingerprint representing a location can be used in several ways in fingerprint matching:

1) A location could be a part of an area, in which case at most one of the locations in the area can be a location estimate in any time slice.

2) A location could be independent of an area, essentially comprising an area consisting of only one location.

3) A location could be used in multiple areas, in which case the location is evaluated multiple times as a possible location estimate—one time per area, each evaluation using the entry and exit cutoffs of the respective area.

4) A location could be used in an area and on its own, in which case the location is again evaluated multiple times—one time per use of the location, and each time using the appropriate entry and exit cutoffs.

Naturally, with a sufficiently large reference RF fingerprint database, the execution time of the fingerprint matching algorithm can be excessive. Many optimizations of the search space are possible including eliminating all reference RF fingerprints from consideration that do not contain a transmitter that is currently observable.

An extension to the fingerprint matching algorithm is to weight each piece of information used in calculating the measure of closeness of a match. For example, if transmitter signal strengths are the information in each RF fingerprint, then a weight could be associated with each signal strength. A good weight would indicate that the transmitter has a reliable signal strength (i.e., there is little variance in the sample RF data) at the location, and must match very closely to be considered a good match. A bad weight would indicate that the transmitter has a less reliable signal strength at the location, and does not have to match very closely to be considered a good match. In the above equation, the weight for each transmitter would be multiplied by the difference in signal strengths for the two RF fingerprints for that transmitter.

In both the survey and run-time processes, the invention comprises tagging RF fingerprints. The same set of RF fingerprints may not be applicable to all cases in which location estimates for a MU are desired. This could be because the RF environment undergoes predictable changes that require different sets of RF fingerprints to be used as reference fingerprints. This could also be because different MUs perceive the RF environment differently (e.g., because they have different types of antennas or the antenna is oriented differently—horizontally in a laptop vs. vertically in a PDA).

To compensate for these types of changes, the invention tags reference RF fingerprints with descriptions of the circumstances under which they apply. Only applicable reference RF fingerprints are compared to a MU RF fingerprint by the fingerprint matching algorithm.

In run-time, additional filtering may be necessary. One technique for preventing location estimates that are highly unlikely given what is known about a MU's current location is to define which movements are more likely than others.

One way to do this is to have the environment maintainer produce a matrix defining the probability of movement between locations, a "probability matrix." The rows and columns of the matrix represent locations. Each cell represents a weight attached to the possibility of a MU moving from one location to the other. Small weights (e.g., 1) represent a strong probability that such a movement is possible for a MU (e.g., crossing a room is highly likely). Large weights (e.g., 50) represent a very unlikely chance that a MU can move directly from one location to the other (e.g., moving directly from one end of a stadium to another).

Figure 8:
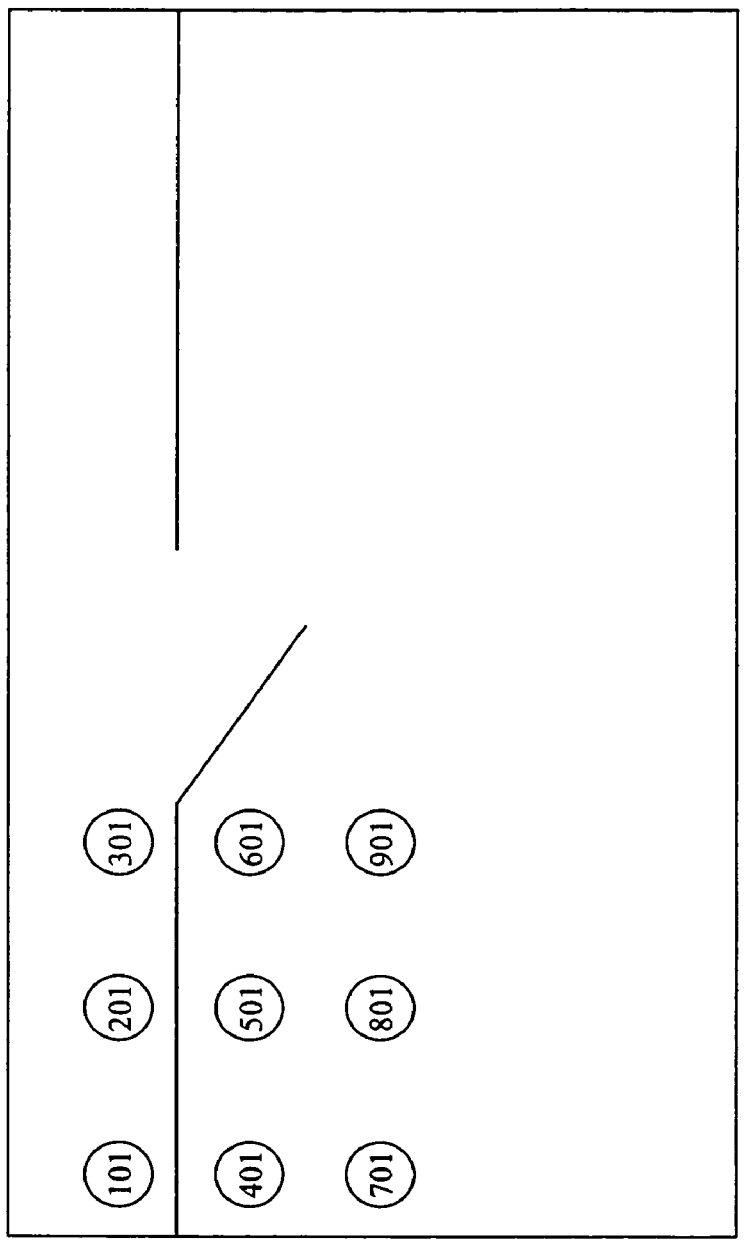
FIG. 8 shows a sample physical environment.

A threshold can then be defined that describes which transitions are and are not considered possible. For example, if the weight describing a transition between two subsequent location estimates exceeds the threshold, then the most recent location estimate will be ignored. In a setting where location estimates are produced in real-time (e.g., once per second), this is an effective technique for eliminating impossible transitions. The weights can be set such that a transition between a location in a room and the hallway outside is highly unlikely (assuming not near a door); but, a transition between two locations within the same room is very likely. FIG. 8 shows a sample physical environment. Assuming a threshold of 10, FIG. 10 illustrates the resulting transition matrix. The following are some of the conclusions we can draw regarding location estimates for this physical environment:

A MU is slightly more likely to stay in location 201 than it is to transition to locations 101 or 301.

A MU currently estimated to be at location 201 is equally likely to transition to location 101 or 301.

A MU currently estimated to be at location 201 cannot transition to locations 401-901, which makes sense since each is on the other side of a wall, and the MU would have to first transition to location 301 in order to go through the door.

This technique can be simplified to avoid having a user fill in an N×N matrix. Instead, a user can fill in only those portions of the matrix that represent adjacent locations between which a transition is possible. Then, the invention uses a shortest-path algorithm like the Floyd-Warshall algorithm to calculate probabilities for transitions between all non-adjacent locations based upon the probabilities supplied for transitions between adjacent locations. FIG. 10 shows the transition matrix for a physical environment.

Another run-time filtering technique involves picking the single best estimate from the RF fingerprints of the MU. When multiple locations estimates are allowed to be valid simultaneously, algorithms can be applied to determine which of the estimates is the "best" for some definition of best. Such algorithms are useful when only a single location estimate is desired for a MU at any point in time. They also add stability to jittery location estimates by preventing such fluctuations.

One such algorithm is a voting algorithm that makes use of a MU's history of location estimates. Location estimates that have been valid for multiple time slices are given more weight (or votes) than location estimates that have only been valid for a few time slices. The algorithm is executed once per round. A round may or may not have the same period as a time slice (the period over which RF data is collected).

The basic algorithm works as follows:

Each round, a location estimate that has been an estimate any time during the last N seconds is given one vote for each round in which it was a valid location estimate.

The last round's winner is given an additional number of votes, making it harder for other estimates to be declared the best.

The location estimate with the largest number of votes is considered the new winner. If there is a tie for the largest number of votes, the previous round's winner takes precedence. If none of the tied winners is the previous round's winner, a new winner is picked randomly.

The following four parameters allow the algorithm to be configured to suit different environments:

Period: The period defines how long a round is; that is, how often voting is performed. For example, a vote is taken once per second.

Window: The window defines how many rounds the voting extends backwards in time. For example, all location estimates for the last 10 seconds. A shorter history results in more frequent changes in best location estimate, but allows estimate changes to keep up with a moving MU.

Delay: This is the amount of time needed to be declared a winner (this is very similar to the entry cutoff discussed in the hysteresis section). For example, a location estimate must have been a valid estimate for at least three seconds in order to be declared the best estimate. A larger delay results in best estimates that have been valid for a longer period, and so are less likely to be random, incorrect estimates. However, a longer delay also results in a longer period of time before a best estimate is picked, and may result in periods during which no location estimate is considered a best estimate.

Bonus: This is amount of time that is added to the previous round's winner's total. For example, the previous round's winner always gets two extra seconds. Increasing the bonus makes it harder for a location estimate to replace the previous winner; this decreases the rate at which best estimates change, but also introduces a time lag before a MU's movement is recognized by a change in best location estimate.

There are several ways to allocate the functionality described in this document to processing units. Principle processing units include MUs, infrastructure supporting a particularly physical environment (e.g., servers), and wireless access points.

MUs are not optional elements. Infrastructure is optional, as likely tasks could be performed by MUs. Wireless access points are optional, but some form of wireless transmitter with a fixed, known location must be present (other possibilities include RF tags).

Some processing unit gathers MU RF fingerprints. This is most likely done by MUs, but "smart" wireless access points could also gather this information. Considerations include whether wireless access points can be enhanced and how much time a wireless device must spend observing the RF environment. An access point might be preferable for the latter consideration, as it could be fitted with multiple radios, one of which could be dedicated to observing the RF environment.

Reference RF fingerprints must be stored in some form of database. They are most likely stored in the infrastructure, but could be stored on the MUs themselves. Considerations include whether the same MUs are always used in the same physical environment, how much data must be stored vs. how much storage capacity MUs have, and how often the data changes.

Reference RF fingerprints must be matched against MU RF fingerprints. This may or may not be performed by the same processing unit that stores the reference RF fingerprint database; however, processing units could also dynamically transmit portions of the database for use at run-time (e.g., a server that hosts the database could send the appropriate reference RF fingerprints to a MU so that it could do fingerprint matching). Fingerprint matching could be performed by a MU or infrastructure. Considerations include how much processing power is required for fingerprint matching, how many units require fingerprint matching, and how much data must be exchanged over the wireless environment (e.g., to transmit the results of matching or portions of the database).

The invention is not to be limited to the disclosed embodiments, but on the contrary is intended to cover various modifications and equivalent arrangements include within the spirit of the scope of the appended claims.

What is claimed is:

1. A method of collecting reference radio frequency (RF) measurements to form RF fingerprints for a reference database to facilitate subsequent location determination of a mobile unit, the method comprising steps of:
providing at least two transmitters that are detectable by said mobile unit at a first location in an area serviced by the at least two transmitters;
collecting a plurality of measurements, each obtained at a respective successive time slice, the plurality of measurements indicative of RF signals transmitted between said mobile unit and a first transmitter of the at least two transmitters at the first location in said area; and
determining a characteristic value based on at least some of the plurality of measurements, the characteristic value forming a first portion of a reference RF fingerprint associated with the first location, wherein determining the characteristic value comprises:
determining if a transmitter of the at least two transmitters for which a plurality of measurements are being collected is out of range or temporarily unobservable for said mobile unit at a particular location in said area;
applying a mathematical function to said plurality of measurements that are not temporarily unobservable or out of range and obtaining the characteristic value from said application of said mathematical function; and
using the characteristic value to form a portion of a reference RF fingerprint to be applied to the database of reference RF fingerprints.

2. The method of claim 1 wherein collecting the plurality of measurements comprises collecting a plurality of measurements at each of a plurality of orientations, and wherein determining the characteristic value comprises determining a characteristic value for each of the plurality of orientations based on at least some of the respective plurality of measurements, the characteristic values forming portions of respective reference RF fingerprints associated with the first location.

3. The method of claim 1 wherein determining the characteristic value comprises averaging the at least some of the plurality of measurements.

4. The method of claim 2 wherein the plurality of orientations includes a plurality of directions between the mobile unit and the first transmitter such that a plurality of measurements is collected at each of the plurality of directions at the first location.

5. The method of claim 1 wherein determining the characteristic value includes ignoring any of the plurality of measurements that are substantially zero and determining the characteristic value based on at least some of the remaining measurements.

6. The method of claim 1 wherein determining the characteristic value comprises identifying which, if any, of the plurality of measurements is an outlier with respect to other of the plurality of measurements based on at least one statistical measurement, and determining the characteristic value based on at least some of the plurality of measurements not identified as outliers.

7. The method of claim 6 wherein a measurement of the plurality of measurements is identified as an outlier if the measurement has a value greater than N standard deviations of an average of said plurality of measurements.

8. The method of claim 6 wherein a measurement of the plurality of measurements is identified as an outlier if the measurement has a value over N units from an average of said plurality of measurements.

9. The method of claim 1 wherein said step of determining if the transmitter is out of range or temporarily unobservable for the mobile unit at the particular location is accomplished by determining that the transmitter is out of range if the transmitter has not been observed in a predetermined number of preceding time slices, and determining that the transmitter is temporarily unobservable if the transmitter has been observed in at least one of the predetermined number of preceding time slices, but is not observable in a current time slice.

10. The method of claim 1 wherein said step of determining if the transmitter is out of range or temporarily unobservable for a mobile unit at a location is accomplished by determining that the transmitter is out of range if the transmitter has not been observed in a predetermined percentage of time slices.

11. The method of claim 1 further comprising:
collecting a plurality of measurements for each of the at least two transmitters, the plurality of measurements indicative of RF signals between the mobile unit and a respective one of the at least two transmitters at the first location;
determining a characteristic value for each of the plurality of measurements collected from respective ones of the at least two transmitters, the characteristic values forming, at least in part, the reference RF fingerprint associated with the first location.

12. The method of claim 1, wherein providing at least two transmitters includes providing at least two transmitters that are located along different axes with respect to a plurality of locations in said area.

13. A method of collecting reference radio frequency (RF) measurements to form RF fingerprints for a reference database to facilitate subsequent location determination of a mobile unit, the method comprising steps of:
providing at least two transmitters that are detectable by said mobile unit at a first location in an area serviced by the at least two transmitters;
collecting a plurality of measurements, each obtained at a respective successive time slice, the plurality of measurements indicative of RF signals transmitted between said mobile unit and a first transmitter of the at least two transmitters at the first location in said area; and
determining a characteristic value based on at least some of the plurality of measurements, the characteristic value forming a first portion of a reference RF fingerprint associated with the first location,
wherein collecting the plurality of measurements comprises collecting a plurality of measurements at each of a plurality of orientations, and wherein determining the characteristic value comprises determining a characteristic value for each of the plurality of orientations based on at least some of the respective plurality of measurements, the characteristic values forming portions of respective reference RF fingerprints associated with the first location, and wherein the plurality of orientations includes a plurality of directions between the mobile unit and the first transmitter such that a plurality of measurements is collected at each of the plurality of directions at the first location, and wherein the plurality of orientations includes a plurality of elevations between the mobile unit and the first transmitter such that a plurality of measurements is collected at each of the plurality of elevations at the first location.

14. A method of determining a location of a mobile unit in an area serviced by a wireless network, the wireless network configured for wireless location determination of said mobile unit and capable of being accessed from within the area via at least one of a plurality of wireless transmitters, the wireless network having a database of reference radio frequency (RF) fingerprints indicative of RF signal levels at a plurality of locations in the area, the method comprising steps of:

collecting a plurality of measurements from each of the plurality of wireless transmitters, the plurality of measurements for each of the plurality of wireless transmitters indicative of RF signal strengths transmitted between said mobile unit and a respective one of the plurality of wireless transmitters at a current location of the mobile unit in the area, each of the plurality of measurements for the respective one of the plurality of wireless transmitters obtained at a respective successive time slice;

determining, for each of the plurality of measurements, a characteristic value based on at least some of the respective plurality of measurements, to form a plurality of characteristic values, each associated with a respective one of the plurality of wireless transmitters, the plurality of characteristic values forming, at least in part, a target RF fingerprint for the mobile device at the current location, wherein determining the characteristic value includes identifying transmitters determined to be out of range or temporarily unobservable by determining if the transmitter has not been observed in a selectable number of preceding time slices, and determining that the transmitter is temporarily unobservable if the transmitter has been observed in said selectable number of preceding time slices, but is not observable in a current time slice; and determining the location of the mobile device by, at least in part, comparing the target RF fingerprint with the database of reference RF fingerprints, wherein determining the characteristic value includes identifying which, if any, of the plurality of measurements is an outlier with respect to other of the plurality of measurements based on at least one statistical measurement, and determining the characteristic value based on at least some of the plurality of measurements not identified as outliers.

15. The method of claim 14 wherein determining a characteristic value includes determining a mode, median, or mean of the plurality of measurements not identified as an outlier.

16. The method of claim 14 wherein a measurement is identified as an outlier if the measurement is outside N standard deviations of an average of the plurality of measurements.

17. The method of claim 14 wherein a measurement is identified as an outlier if the measurement is over N units from an average of the plurality of measurements.

18. The method according to claim 14 further comprising determining that a transmitter is out of range if the transmitter has not been observed in a selectable percentage of time slices for the mobile unit at said respective location.

19. The method of claim 14 wherein the selectable number of preceding slices is selected based, at least in part, on motion of the mobile unit.

20. The method of claim 18 wherein the selectable percentage of time slices is selected based, at least in part, on motion of the mobile unit.

21. The method of claim 14, wherein determining the characteristic value includes averaging the plurality of measurements not identified as being out of range or temporarily unobservable.

\* \* \* \* \*